(12) United States Patent
Xie et al.

(10) Patent No.: US 12,489,122 B2
(45) Date of Patent: Dec. 2, 2025

(54) FUEL CELL BIPOLAR PLATE AND PREPARATION METHOD

(71) Applicant: Haidriver (Shanghai) Energy Technology Co., Ltd, Shanghai (CN)

(72) Inventors: Jiaping Xie, Shanghai (CN); Wei Zhu, Shanghai (CN); Jun Shen, Shanghai (CN); Zhihang Ren, Shanghai (CN); Xiaozhen Zhao, Shanghai (CN)

(73) Assignee: Haidriver (Shanghai) Energy Technology Co., Ltd, Shanghai (CN)

( * ) Notice: Subject to any disclaimer, the term of this patent is extended or adjusted under 35 U.S.C. 154(b) by 573 days.

(21) Appl. No.: 17/955,671

(22) Filed: Sep. 29, 2022

(65) Prior Publication Data
US 2023/0124751 A1 Apr. 20, 2023

(30) Foreign Application Priority Data
Oct. 20, 2021 (CN) .......................... 202111220631.0

(51) Int. Cl.
*H01M 8/0267* (2016.01)
*H01M 8/026* (2016.01)

(52) U.S. Cl.
CPC ......... *H01M 8/0267* (2013.01); *H01M 8/026* (2013.01)

(58) Field of Classification Search
CPC .............. H01M 8/0267; H01M 8/026; H01M 8/04029; H01M 8/0258; H01M 4/86; H01M 4/88; Y02E 60/50
See application file for complete search history.

(56) References Cited

U.S. PATENT DOCUMENTS

2005/0153184 A1  7/2005  Beutel et al.

FOREIGN PATENT DOCUMENTS

| CN | 109514904 A | 3/2019 |
| CN | 110212213 A | 9/2019 |
| CN | 110444783 A | 11/2019 |
| CN | 111106361 A | 5/2020 |

(Continued)

OTHER PUBLICATIONS

First Office Action of the China National Intellectual Property Administration (CNIPA) dated Feb. 11, 2023, in related Chinese Appl. No. 202111220631.0, 6 pages.

(Continued)

*Primary Examiner* — Helen Oi K Conley
(74) *Attorney, Agent, or Firm* — Bochner PLLC; Andrew D. Bochner

(57) ABSTRACT

The present disclosure provides a fuel cell bipolar plate and a preparation method. The method includes: synchronously performing cathode flow field pre-rolling and anode flow field pre-rolling on both surfaces of a pair of flexible graphite coils; synchronously performing cathode flow field secondary rolling and anode flow field secondary rolling on both surfaces of the pre-rolled flexible graphite coils; cutting oxidant inlets/outlets, fuel inlets/outlets, and coolant inlets/outlets in the flexible graphite coils after secondary rolling, and cutting the flexible graphite coils into a bipolar plate shape to obtain a cathode plate and an anode plate; performing resin impregnating, cleaning, and curing on the cathode plate and the anode plate; oppositely arranging and bonding the cathode plate and the anode plate to form a fuel cell bipolar plate; synchronously fitting a cathode stiffener and an anode stiffener to obtain a finished fuel cell bipolar plate.

3 Claims, 6 Drawing Sheets

(56) References Cited

FOREIGN PATENT DOCUMENTS

| | | |
|---|---|---|
| CN | 111509250 A | 8/2020 |
| CN | 211480190 U | 9/2020 |
| CN | 112164810 A | 1/2021 |
| CN | 112768720 A | 5/2021 |
| CN | 112976651 A | 6/2021 |

OTHER PUBLICATIONS

Second Office Action of the China National Intellectual Property Administration (CNIPA) dated Apr. 26, 2023, in related Chinese Appl. No. 202111220631.0, 7 pages.

FUEL CELL BIPOLAR PLATE AND PREPARATION METHOD

CROSS REFERENCE TO RELATED APPLICATION

This patent application claims the benefit and priority of Chinese Patent Application No. 202111220631.0, filed on Oct. 20, 2021, the disclosure of which is incorporated by reference herein in its entirety as part of the present application.

TECHNICAL FIELD

The present disclosure relates to the technical field of fuel cells, and in particular, to a fuel cell bipolar plate and a preparation method.

BACKGROUND ART

The parallel flow field design of the current bipolar plate has the characteristic of low pressure drop. However, a small difference of the flow and the reaction condition of a gas in a flow field will disturb the overall performance of a cell, which is prone to unstable performance. In addition, the bipolar plate in the prior art has narrow cooling channels, high pressure drop at inlets and outlets, and uneven distribution in each cooling channel. The bipolar plate needs to provide a sufficient thickness to meet the circulation of a coolant, so that the overall length and weight cannot be reduced after the bipolar plates are assembled into a stack. When the cell outputs to work, the coolant flows through the cooling channels, and the coolant is distributed unevenly due to the different distance between each cooling channel and the inlets, so that the heat generated by a reaction cannot exchange with that of the coolant uniformly, and locally generated water condenses and accumulates to block part of the gas channels, thereby causing the failure of the cell.

SUMMARY

An objective of the present disclosure is to provide a fuel cell bipolar plate and a preparation method, so as to solve the problems that the bipolar plate processed by the current method has the problems, such as great thickness, heavy weight, easiness in damage, high cost, and the like.

The fuel cell bipolar plate provided by the present disclosure includes a cathode plate and an anode plate. The cathode plate has a cathode reactant flow field and a cathode coolant flow field. The anode plate has an anode reactant flow field and an anode coolant flow field. Each of the cathode plates and the anode plates is provided with oxidant inlets/outlets, fuel inlets/outlets, and coolant inlets/outlets. The cathode coolant flow field and the anode coolant flow field are respectively formed by arranging a plurality of channels with channel peaks and channel valleys at equal intervals. When a cathode plate and an anode plate are combined, the channels of the cathode coolant flow field and the channels of the anode coolant flow field are in double-layer. The channel peaks of the channels of the cathode coolant flow field and the channel valleys of the channels of the anode coolant flow field are arranged oppositely, and the channel valleys of the channels of the cathode coolant flow field and the channel peaks of the channels of the anode coolant flow field are arranged oppositely.

Preferably, the channel quantity of the cathode coolant flow fields is the same as that of the anode coolant flow fields.

Preferably, the distance between a channel peak and a channel valley of the channel of the cathode coolant flow field is equal to that of the anode coolant flow field.

Preferably, the head ends and the tail ends of all channels of the cathode coolant flow field are flush, and those of the anode coolant flow field are also flush.

Preferably, the channel depths of the cathode coolant flow field and the anode coolant flow field are 0.25 to 0.35 mm.

Preferably, the channel widths of the cathode coolant flow field and the anode coolant flow field are 0.35 to 0.85 mm.

Preferably, the fuel cell bipolar plate further includes a cathode stiffener and an anode stiffener. The cathode stiffener is arranged among the periphery of the cathode reactant flow field, the oxidant inlets/outlets, the fuel inlets/outlets, and the coolant inlets/outlets; and the anode stiffener is arranged among the periphery of the anode reactant flow field, the oxidant inlets/outlets, the fuel inlets/outlets, and the coolant inlets/outlets.

The present disclosure further provides a preparation method for a fuel cell bipolar plate, which includes the following steps in sequence:

S1, synchronously performing flow field pre-rolling on both surfaces of a pair of flexible graphite coils, where a cathode reactant flow field and a cathode coolant flow field are respectively pre-rolled on both surfaces of one of the flexible graphite coils, and an anode reactant flow field and an anode coolant flow field are respectively pre-rolled on both surfaces of the other flexible graphite coil;

S2, synchronously performing flow field secondary rolling on both surfaces of the two pre-rolled flexible graphite coils in S1;

S3, cutting the oxidant inlets/outlets, the fuel inlets/outlets, and the coolant inlets/outlets in the two flexible graphite coils after secondary rolling in S2, and cutting the flexible graphite coils into a bipolar plate shape to obtain a cathode plate and an anode plate;

S4, impregnating the cathode plate and the anode plate with resin, and then cleaning and curing the impregnated cathode plate and anode plate;

S5, oppositely arranging and bonding the cathode coolant flow field of the cathode plate and the anode coolant flow field of the anode plate after being cleaned and cured, so as to form a fuel cell bipolar plate; and S6, synchronously fitting a cathode stiffener and an anode stiffener of the fuel cell bipolar plate, so as to obtain a finished fuel cell bipolar plate.

Preferably, the initial thickness of the flexible graphite coils in S1 is 1.5 to 3.0 mm; the thickness of the pre-rolled flexible graphite coils is reduced to 1.2 to 1.6 mm; and the channel depths of the cathode reactant flow field, the cathode coolant flow field, the anode reactant flow field, and the anode coolant flow field formed by pre-rolling reach 0.3 to 0.5 mm.

Preferably, the thickness of the flexible graphite coils in S2 is reduced to 0.8 to 1.0 mm after the secondary rolling; the channel depths of the cathode reactant flow field, the cathode coolant flow field, the anode reactant flow field, and the anode coolant flow field formed by the secondary rolling reach 0.25 to 0.35 mm; and the wall thickness is 0.2 to 0.25 mm.

Compared with the prior art, the present disclosure has the beneficial effects that:

The overall process of the preparation method for a fuel cell bipolar plate of the present disclosure adopts automatic operation, the quality is stable and controllable, and the yield is high. The bipolar plate manufactured by the method of the present disclosure has the thickness that can be reduced to 1.4 to 2.0 mm, and has the advantages of thinness and lightness. A cathode flow field and an anode flow field are processed by a two-step rolling technology in the patent, air in a graphite material can be completely eliminated to avoid the generation of an elastic interval, thereby improving the size precision. In the patent, the overall strength of the bipolar plate is improved by fitting the cathode stiffeners and the anode stiffeners. Moreover, the sealing performance is improved, which effectively prevents a gas from crossing between a cathode and an anode. A three-dimensional (3D) mesh coolant chamber is formed by the coolant flow fields of the cathode plate and the anode plate. A coolant flows from coolant inlets to coolant outlets in a form of 3D broken lines. The coolant automatically selects a path with low resistant to flow, which improves the distribution uniformity of the coolant, does not block the gas channels, and improves the heat exchange efficiency.

Figure 1:
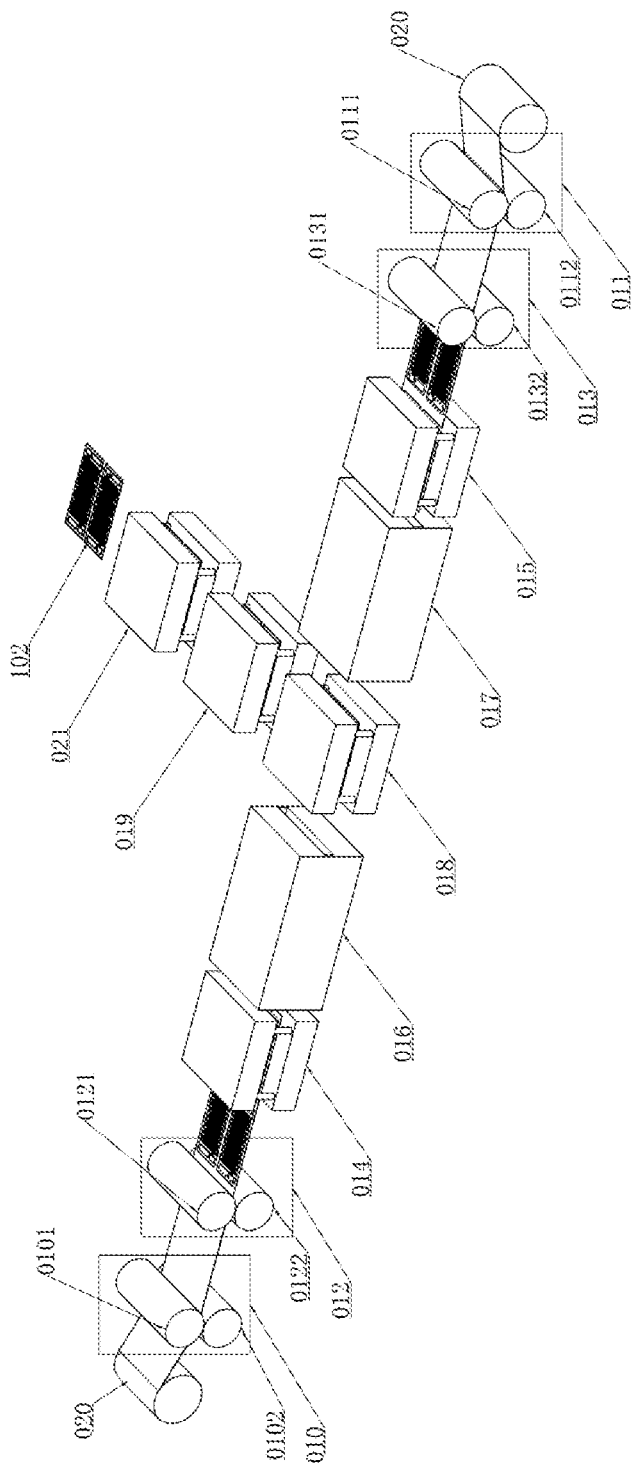
FIG. 1 illustrates a schematic flowchart of a preparation method of the present disclosure.

Reference signs in the drawings:

flexible graphite coil 020, first rolling die 010, first upper roll 0101, first lower roll 0102, second rolling die 011, second upper roll 0111, second lower roll 0112, third rolling die 012, third upper roll 0121, third lower roll 0122, fourth rolling die 013, fourth upper roll 0131, fourth lower roll 0132, first die-cutting device 014, second die-cutting device 015, first resin impregnation device 016, second resin impregnation device 017, bipolar plate fitting device 018, stiffener fitting device 019, gas leakage detection device 021, cathode stiffener 031, anode stiffener 032, cathode plate 001, anode plate 002, oxidant inlet/outlet 003, fuel inlet/outlet 004, coolant inlet/outlet 005, cathode coolant flow field 1, anode coolant flow field 2, cathode channel 10, cathode channel peak 100, cathode channel valley 110, anode channel 20, anode channel peak 200, and anode channel valley 210. In FIG. 1, a, b, and c refer to three flow directions of a coolant.

DETAILED DESCRIPTION OF THE EMBODIMENTS

Technical solutions in the embodiments of the present disclosure will be clearly and completely described below with reference to the drawings in the embodiments of the present disclosure. Apparently, the described embodiments are merely part rather than all of the embodiments of the present disclosure. On the basis of the embodiments of the present disclosure, all other embodiments obtained by those of ordinary skill in the art without creative work fall within the scope of protection of the present disclosure.

EMBODIMENT

Figure 2:
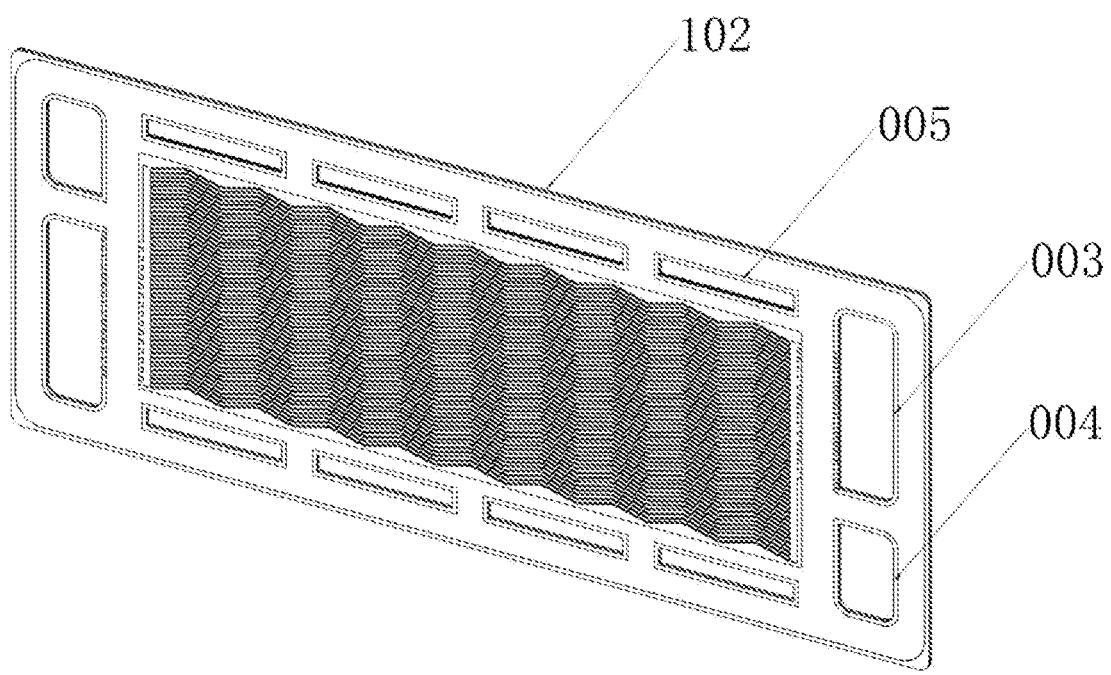
FIG. 2 illustrates a schematic structural diagram of a bipolar plate prepared by the preparation method of the present disclosure.

Referring to FIG. 1 and FIG. 2, the process of a preparation method for a fuel cell bipolar plate provided by the present embodiment is as shown in FIG. 1. The fuel cell bipolar plate 102 prepared by the preparation method for a fuel cell bipolar plate provided by the present embodiment is as shown in FIG. 2. The method includes the following steps in sequence.

S1, flow field pre-rolling is synchronously performed on both surfaces of a pair of flexible graphite coils 020, where, upper and lower surfaces of the flexible graphite coil 020 on the left side of FIG. 1 is pre-rolled through a first rolling die 010, a first upper roll 0101 of the first rolling die 010 pre-rolls a cathode reactant flow field, and a first lower roll 0102 of the first rolling die 010 pre-rolls a cathode coolant flow field 1; upper and lower surfaces of the flexible graphite coil 020 on the right side of FIG. 1 is pre-rolled through a second rolling die 011, a second upper roll 0111 of the second rolling die 011 pre-rolls an anode reactant flow field, and a second lower roll 0112 of the second rolling die 011 pre-rolls an anode coolant flow field 2.

The initial thickness of the flexible graphite coils 020 is 1.5 to 3.0 mm; the thickness of the pre-rolled flexible graphite coils 020 is reduced to 1.2 to 1.6 mm; and the channel depths of the cathode reactant flow field, the cathode coolant flow field 1, the anode reactant flow field, and the anode coolant flow field 2 formed by pre-rolling reach 0.3 to 0.5 mm.

S2, flow field secondary rolling is synchronously performed on both surfaces of the two pre-rolled flexible graphite coils 020 in S1. Where, upper and lower surfaces of the flexible graphite coil 020 on the left side of FIG. 1 is subjected to the secondary rolling through a third rolling die 012, a third upper roll 0121 of the third rolling die 012 performs secondary rolling on the cathode reactant flow field, and a third lower roll 0122 of the third rolling die 012 performs the secondary rolling on the cathode coolant flow field 1; upper and lower surfaces of the flexible graphite coil 020 on the right side of FIG. 1 is pre-rolled through a fourth rolling die 013, a fourth upper roll 0131 of the fourth rolling die 013 performs the secondary rolling on the anode reactant flow field, and a fourth lower roll 0132 of the fourth rolling die 013 performs the secondary rolling on the anode coolant flow field 2.

The thickness of the flexible graphite coils 020 in S2 is reduced to 0.8 to 1.0 mm after the secondary rolling; the channel depths of the cathode reactant flow field, the cathode coolant flow field 1, the anode reactant flow field, and the anode coolant flow field 2 formed by the secondary rolling reach 0.25 to 0.35 mm; and the wall thickness is 0.2 to 0.25 mm.

S3, the oxidant inlets/outlets 003, the fuel inlets/outlets 004, and the coolant inlets/outlets 005 are cut in the two flexible graphite coils 020 after the secondary rolling in S2, and cutting the flexible graphite coils into a bipolar plate shape to obtain a cathode plate 001 and an anode plate 002. The flexible graphite coil 020 on the left side of FIG. 1 is cut to form the cathode plate 001 through a first die-cutting device 014. The flexible graphite coil 020 on the right side of FIG. 1 is cut to form the anode plate 002 through a second die-cutting device 015.

S4, the cathode plate 001 and the anode plate 002 are impregnated with resin, and then the impregnated cathode plate 001 and anode plate 002 are cleaned and cured. The cathode plate 001 is subjected to the resin impregnation through a first resin impregnation device 016, and is cleaned and cured. The anode plate 002 is subjected to resin impregnation through a second resin impregnation device 017, and is cleaned and cured.

S5, the cathode coolant flow field 1 of the cathode plate 001 and the anode coolant flow field 2 of the anode plate 002 after being cleaned and cured are oppositely arranged and are bonded through a bipolar plate fitting device 018, so as to form a fuel cell bipolar plate 102.

S6, a cathode stiffener 031 and an anode stiffener 032 of the fuel cell bipolar plate 102 are synchronously fitted by using a stiffener fitting device 019, so as to obtain a finished fuel cell bipolar plate 102. The materials of the anode stiffener 032 and the cathode stiffener 031 are generally selected from of polymer sheets or stainless steel sheets with a thickness of 25 to 100 μm.

S7, gas leakage detection is performed on the fuel cell bipolar plate 102 by using a gas leakage detection device 021. The qualified requirements for the gas leakage detection are generally that nitrogen is used for the detection, the detection pressure is 200 kPa, the detection temperature is 25° C., and the leakage rate is 0 to 0.05 ml/min.

The difference between the method of the present embodiment and the prior art is that the cathode plate 001 and the anode plate 002 may be prepared simultaneously, and the prepared cathode plate 001 and anode plate 002 are combined into the fuel cell bipolar plate 102. The overall process can be automatically controlled, and the production efficiency of the bipolar plate is greatly improved.

According to the present embodiment, the flexible graphite coils, which have a porous structure with many closed and open pores inside, are selected to manufacture the bipolar plate. Air cannot be completely exhausted from these pores through primary rolling, thus an elastic interval is formed. This elastic interval will lead to material layering or size rebounding. The layering will lead to the damage of a product, and the size rebounding will lead to that the product does not meet a design requirement. By using secondary rolling, the present embodiment has the advantages that the size precision is higher, and a material layering phenomenon is avoided. The design requirement can be met and the product quality can be ensured through secondary rolling, so there is no need to roll for more times.

Figure 3:
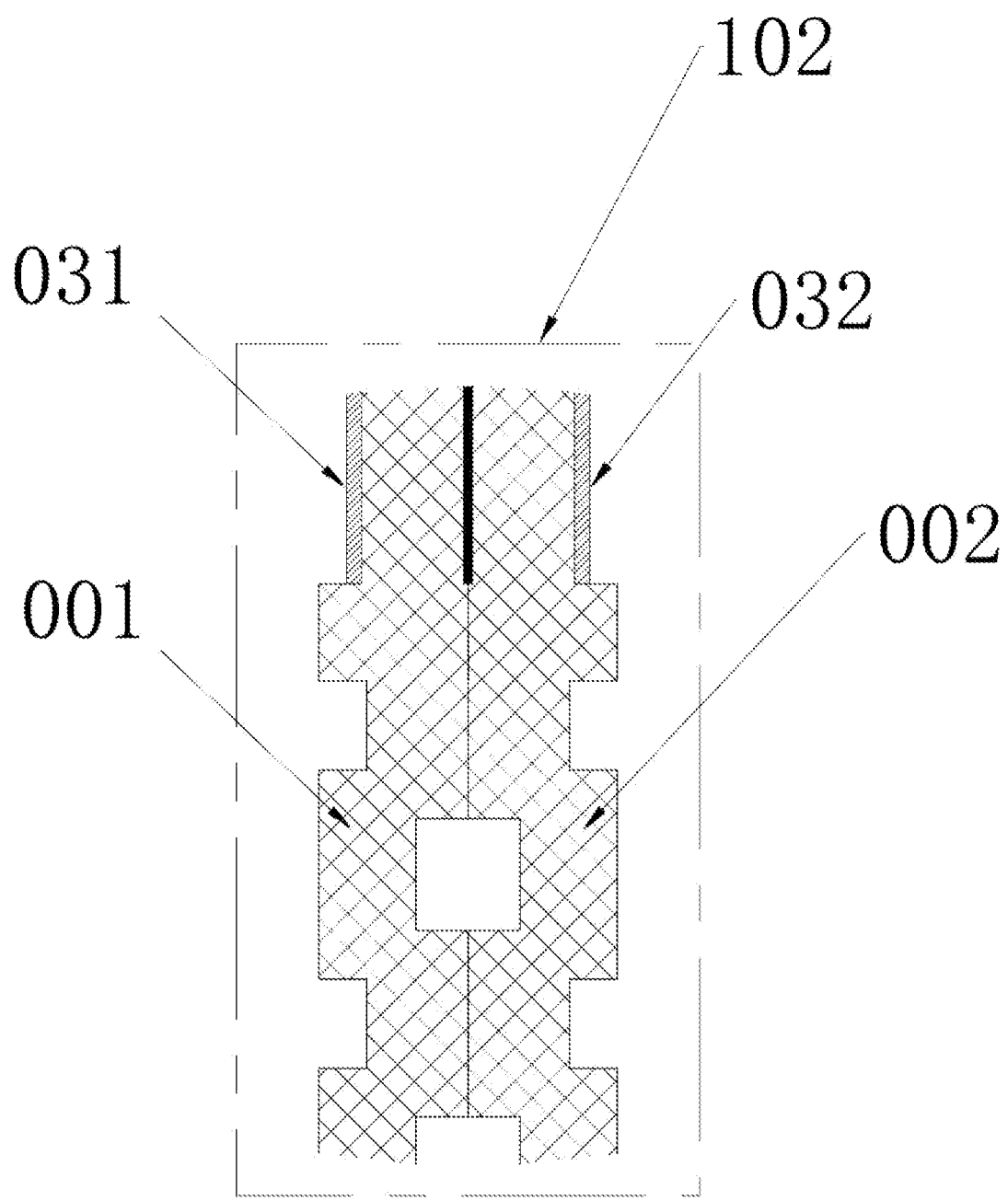
FIG. 3 illustrates a partially enlarged view of a sectional view of a fuel cell bipolar plate.

Referring to FIG. 3, the preparation method of the present embodiment also has a step of fitting the cathode stiffener 031 and the anode stiffener 032 for the cathode plate 001 and the anode plate 002. The cathode stiffener 031 is arranged among the periphery of the cathode reactant flow field, oxidant inlets/outlets 003, fuel inlets/outlets 004, and coolant inlets/outlets 005. The anode stiffener 032 is arranged among the periphery of the anode reactant flow field, the oxidant inlets/outlets 003, the fuel inlets/outlets 004, and the coolant inlets/outlets 005. The cathode stiffener 031 mainly provides enough support strength of sealing in the cathode side and enhances the overall strength of the bipolar plate 102. The anode stiffener 032 mainly provides enough support strength of sealing in the anode side and enhances the overall strength of the bipolar plate 102.

As a preferred implementation mode of the present embodiment, the method of fitting the anode stiffener 032 and the cathode stiffener 031 in S6 is that: the anode stiffener 032 and the cathode stiffener 031 are adsorbed by vacuum, and the anode stiffener 032 and the cathode stiffener 031 are coated with glue, the anode stiffener 032 and the cathode stiffener 031 are fit to corresponding positions of the anode plate 002 and the cathode plate 001 with the pressure of 0.5 to 1.5 MPa.

Figure 4:
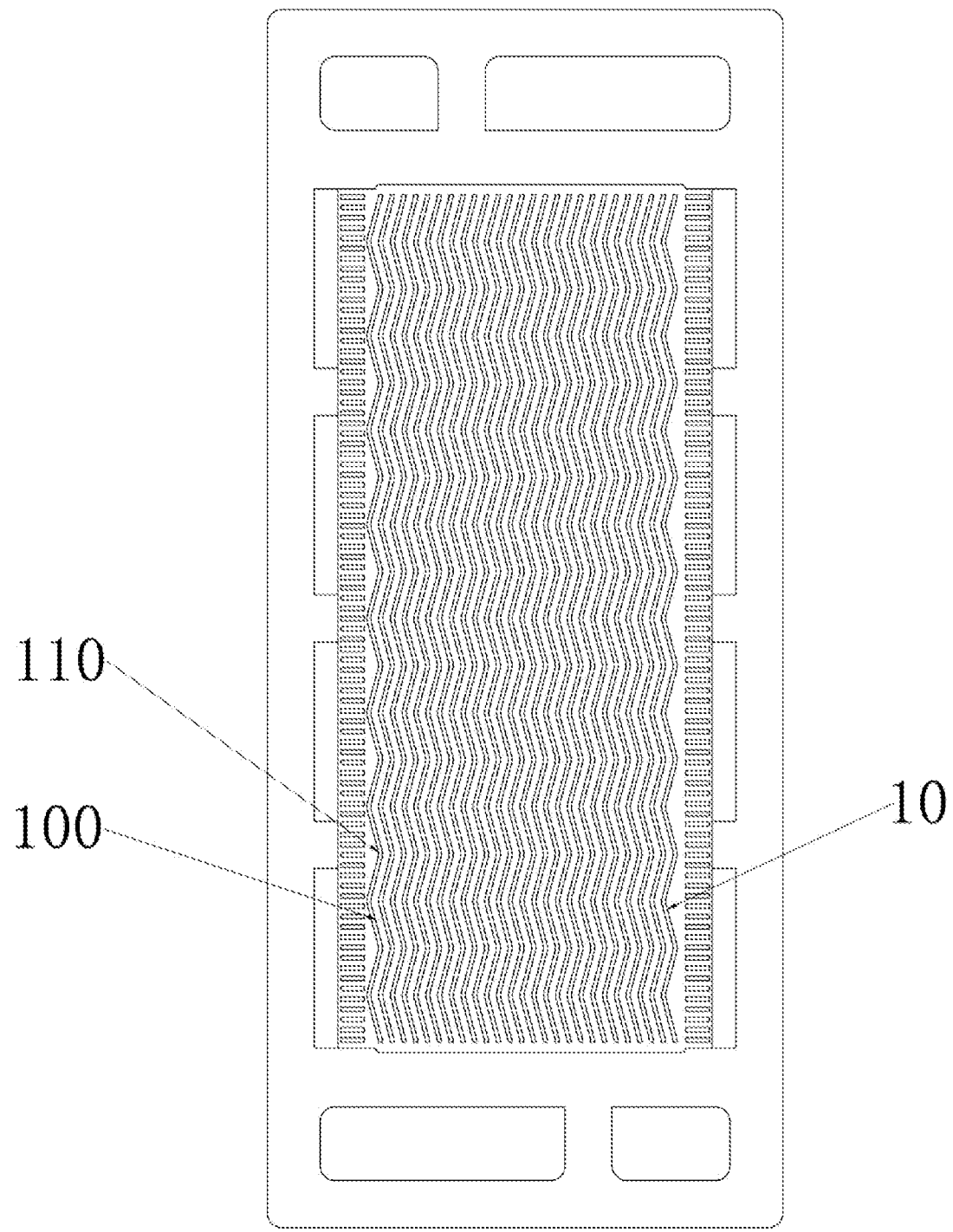
FIG. 4 illustrates a schematic diagram of a cathode plate.

The fuel cell bipolar plate 102 provided by the present disclosure includes a cathode plate 001 and an anode plate 002. The cathode plate 001 has a cathode reactant flow field and a cathode coolant flow field 1. The anode plate 002 has an anode reactant flow field and an anode coolant flow field 2. The cathode plate 001 and the anode plate 002 are both provided with oxidant inlets/outlets 003, fuel inlets/outlets 004, and coolant inlets/outlets 005. The cathode coolant flow field 1 is formed by arranging a plurality of cathode channels 10 with channel peaks 100 and channel valleys 110 at equal intervals. FIG. 4 illustrates the cathode plate 001 of the fuel cell. The cathode channels 10 rolled on the cathode plate 001 of the present embodiment are in a broken line structure. The channel peaks 100 refer to: convex ends, adjacent to the cathode coolant inlets, of the cathode channels 10 on the plane of the cathode plate 001; and the channel valleys 110 refer to: convex ends, adjacent to cathode coolant outlets, of the cathode channels 10 on the plane of the cathode plate 001.

Figure 5:
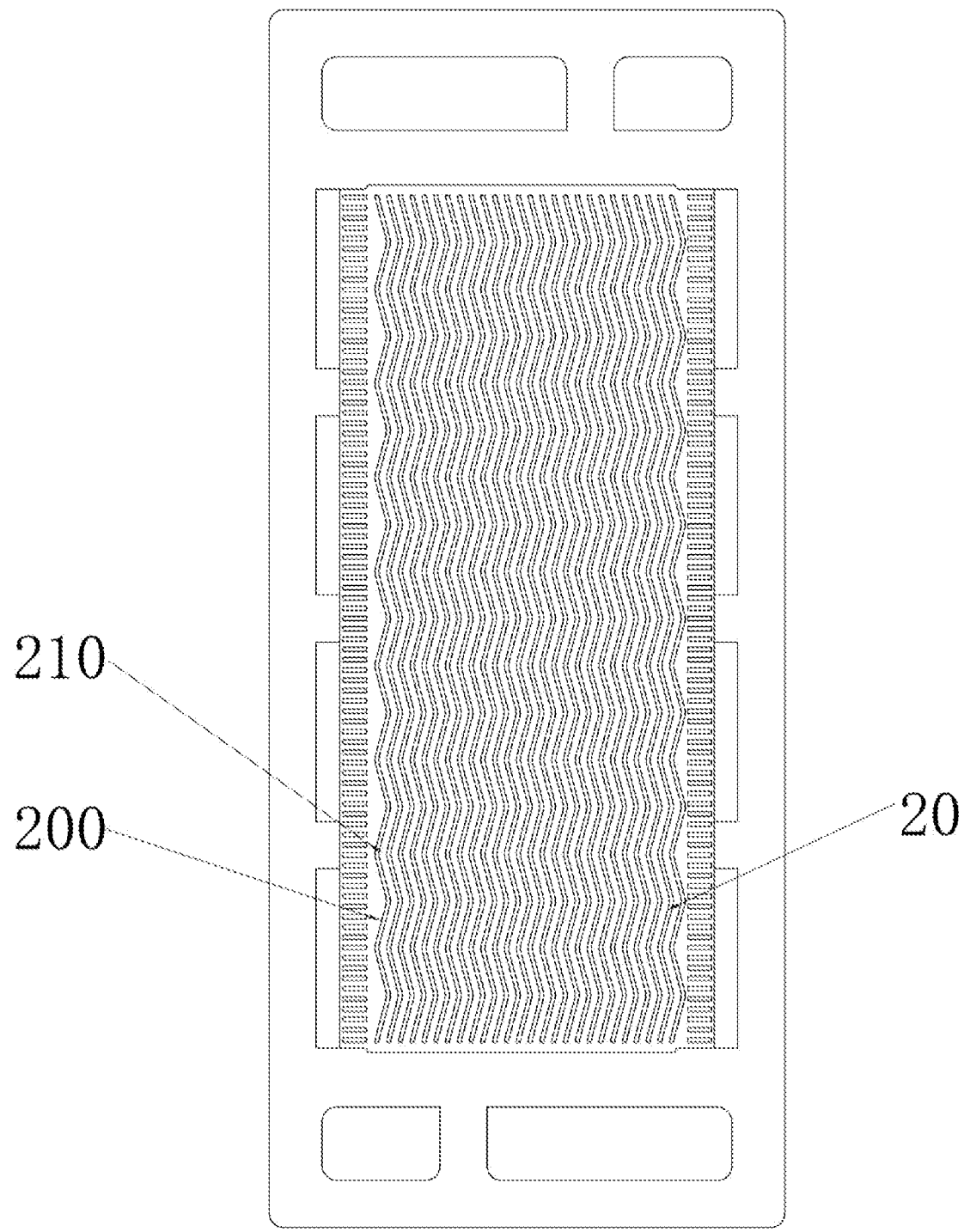
FIG. 5 illustrates a schematic diagram of an anode plate.

The anode coolant flow field 2 is formed by arranging a plurality of anode channels 20 with channel peaks 200 and channel valleys 210 at equal intervals. FIG. 5 illustrates the anode plate 002 of the fuel cell. The anode channels 20 rolled on the anode plate 002 of the present embodiment are also in a broken line structure. The anode plate 002 is provided with anode coolant inlets and anode coolant outlets. The channel peaks 200 refer to: the convex ends, adjacent to the anode coolant inlets, of the anode channels 20 on the plane of the anode plate 002; and the channel valleys 210 refer to: the convex ends, adjacent to the anode coolant outlets, of the anode channels 20 on the plane of the anode plate 002. The purpose of defining the channel peaks and the channel valleys of the cathode channels 10 and the anode channels 20 in the present embodiment is only to explain the detailed structure of the bipolar plate coolant flow field. Apparently, we can also define that one side, adjacent to the coolant inlets, of the channel is a channel valley, and one side, adjacent to the coolant outlets, of the channel is a channel peak, which all fall within the scope of protection of the patent.

The shapes of the cathode channels 10 and the anode channels 20 are not limited to the broken line structures, for example, wave line shapes with peaks and valleys may also be implemented.

Figure 6:
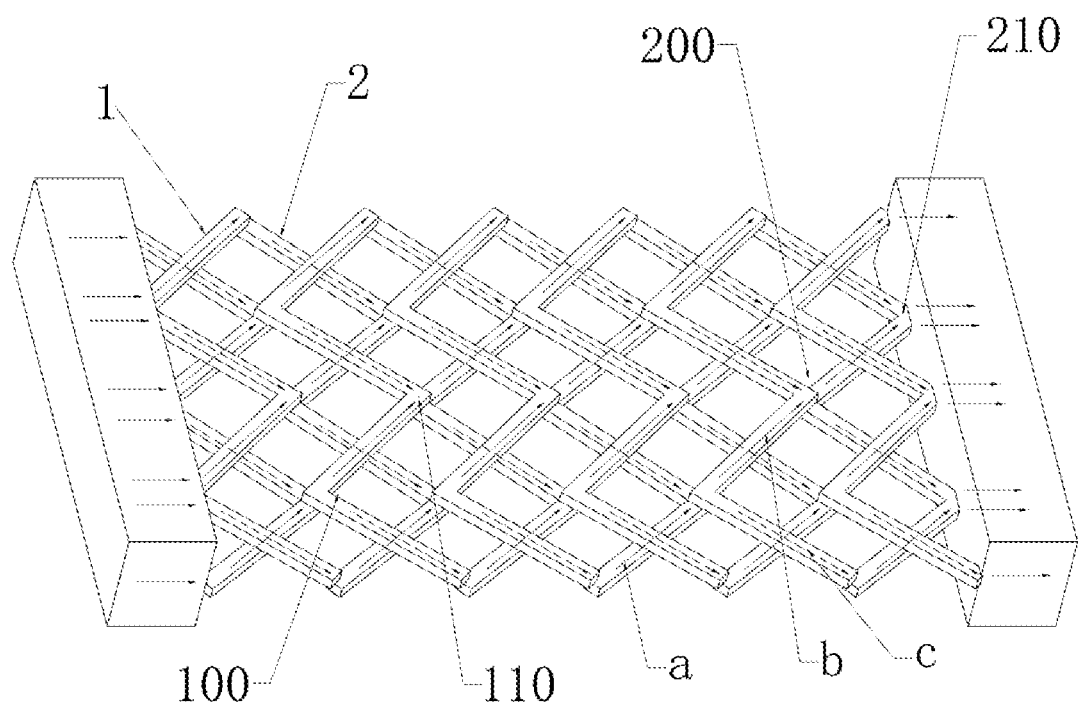
FIG. 6 illustrates a schematic diagram of a three-dimensional structure of a coolant flow field of the fuel cell bipolar plate.

In FIG. 6, the left side illustrates coolant inlets (including cathode coolant inlets and anode coolant inlets), and the right side illustrates coolant outlets (including cathode coolant outlets and anode coolant outlets). When the cathode plate 001 and the anode plate 002 are fitted, the cathode channels 10 and the anode channels 20 are in upper and lower layers. The channel peaks 100 of the cathode channels 10 and the channel valleys 210 of the anode channels 20 are arranged oppositely in the longitudinal direction, and the cathode channel valleys 110 and the anode channel peaks 200 are arranged oppositely in the longitudinal direction. In FIG. 6, a direction indicated by an arrow is a flow direction of a coolant, the coolant enters the 3D mesh coolant chamber formed by the cathode channels 10 and the anode channels 20 from the coolant inlets, and the coolant flows in 3D broken lines. Specifically, the coolant inside the cathode channels 10 will flow into the anode channels 20 downwards, and the coolant inside the anode channels 20 will also flow into the cathode channels 10 upwards. The flow direction is determined according to the resistance. For example, in FIG. 6, the coolant in direction a may flow upward to direction b or c; and if the resistance in direction b is less than that in direction c, then more coolant flows in direction b than in direction c, so as to ensure the uniformity of the coolant in direction b and in direction c. Thus, the coolant of each area will automatically flow according to a path with the lowest resistance, so that the coolant is distributed more uniformly, and the cooling uniformity is greatly improved.

A fuel cell can only be manufactured when the structures of the cathode plate 002 and the anode plate 001 are completely matched. Therefore, the quantity of the cathode channels 10 of the cathode coolant flow field 1 is the same as that of the anode channels 20 of the anode coolant flow field 2. Referring to FIG. 4 and FIG. 5, further, the head ends and the tail ends of the cathode channels 10 and the anode channels 20 of the present embodiment are in flush design, and moreover, the distance between a channel peak 100 and a channel valley 110 of a cathode channel 10 of the cathode coolant flow field 1 is equal to the distance between a channel peak 200 and a channel valley 210 of an anode channel 20 of the anode coolant flow field 2.

As a preferred implementation mode of the present embodiment, the depths of the cathode channels 10 of the cathode coolant flow field 1 and the anode channels 20 of the anode coolant flow field 2 are 0.25 to 0.35 mm.

As a preferable implementation mode of the present embodiment, the widths of the cathode channels 10 of the cathode coolant flow field 1 and the anode channels 20 of the anode coolant flow field 2 are 0.35 to 0.85 mm.

A fuel cell stack is generally stacked by using a fuel cell bipolar plate 102 and a membrane electrode assembly (MEA). Based on the performance of 1.1 W/cm$^2$@0.65V and the active area of 300 cm$^2$ of a conventional MEA at current, the highest volume power density of the fuel cell stack is usually 4.5 kW/L.

Although the embodiments of the present disclosure have been shown and described, those of ordinary skill in the art can understand that a variety of changes, modifications, substitutions and variants can be made to these embodiments without departing from the principle and purpose of the present disclosure, and the scope of the present disclosure is defined by the claims and their equivalents.

What is claimed is:

1. A preparation method for a fuel cell bipolar plate, comprising the following steps in sequence:
    S1, synchronously performing flow field pre-rolling on both surfaces of a pair of flexible graphite coils, wherein a cathode reactant flow field and a cathode coolant flow field are respectively pre-rolled on both surfaces of one of the flexible graphite coils, and an anode reactant flow field and an anode coolant flow field are respectively pre-rolled on both surfaces of the other flexible graphite coil;
    S2, synchronously performing flow field secondary rolling on both surfaces of the two pre-rolled flexible graphite coils in S1;
    S3, cutting the oxidant inlets/outlets, the fuel inlets/outlets, and the coolant inlets/outlets in the two flexible graphite coils after the secondary rolling in S2, and cutting the flexible graphite coils into a bipolar plate shape to obtain a cathode plate and an anode plate;
    S4, impregnating the cathode plate and the anode plate with resin, and then cleaning and curing the impregnated cathode plate and anode plate;
    S5, oppositely arranging and bonding the cathode coolant flow field of the cathode plate and the anode coolant flow field of the anode plate after being cleaned and cured to form a fuel cell bipolar plate; and
    S6, synchronously fitting a cathode stiffener and an anode stiffener of the fuel cell bipolar plate to obtain a finished fuel cell bipolar plate.

2. The preparation method for a fuel cell bipolar plate according to claim 1, wherein the initial thickness of the flexible graphite coils in S1 is 1.5 to 3.0 mm; the thickness of the pre-rolled flexible graphite coils is reduced to 1.2 to 1.6 mm; and the channel depths of the cathode reactant flow field, the cathode coolant flow field, the anode reactant flow field, and the anode coolant flow field formed by the pre-rolling reach 0.3 to 0.5 mm.

3. The preparation method for a fuel cell bipolar plate according to claim 1, wherein the thickness of the flexible graphite coils in S2 is reduced to 0.8 to 1.0 mm after the secondary rolling; the channel depths of the cathode reactant flow field, the cathode coolant flow field, the anode reactant flow field, and the anode coolant flow field formed by the secondary rolling reach 0.25 to 0.35 mm; and the wall thickness is 0.2 to 0.25 mm.

* * * * *